(12) United States Patent
Nelson (10) Patent No.: US 11,434,089 B2
(45) Date of Patent: Sep. 6, 2022

(54) ADAPTER PLATE ASSEMBLY

(71) Applicant: Devin Nelson, Farmington, UT (US)

(72) Inventor: Devin Nelson, Farmington, UT (US)

( * ) Notice: Subject to any disclaimer, the term of this patent is extended or adjusted under 35 U.S.C. 154(b) by 250 days.

(21) Appl. No.: 16/892,684

(22) Filed: Jun. 4, 2020

(65) Prior Publication Data

US 2021/0380352 A1    Dec. 9, 2021

(51) Int. Cl.
*B65G 57/00* (2006.01)
*B65D 21/02* (2006.01)

(52) U.S. Cl.
CPC ....... *B65G 57/005* (2013.01); *B65D 21/0224* (2013.01)

(58) Field of Classification Search
CPC .............. B65G 57/005; B65D 21/0224; B65D 2519/00935; A47B 87/00; A47B 87/02; A47B 87/005; A47B 87/0276; A47B 87/0284
USPC ............ 108/28, 111, 53.1; 302/107; 312/108
See application file for complete search history.

(56) References Cited

U.S. PATENT DOCUMENTS

| | | | | |
|---|---|---|---|---|
| 5,525,030 A | * | 6/1996 | Buchman | B65G 57/005 414/789.5 |
| 5,606,921 A | * | 3/1997 | Elder | B65D 19/0018 108/901 |
| 8,881,934 B2 | | 11/2014 | Tujague, Sr. | |
| 2010/0219193 A1 | * | 9/2010 | Becklin | B65D 21/0224 220/630 |
| 2011/0179977 A1 | * | 7/2011 | Linares | B65D 19/0018 108/50.11 |
| 2017/0166352 A1 | | 6/2017 | Hoppe | |
| 2018/0220758 A1 | | 8/2018 | Burchia | |
| 2019/0384029 A1 | | 12/2019 | Badar | |

FOREIGN PATENT DOCUMENTS

| | | |
|---|---|---|
| EP | 2703536 | 5/2014 |
| WO | WO2020001917 | 1/2020 |

* cited by examiner

*Primary Examiner* — Rafael A Ortiz
*Assistant Examiner* — Sanjidul Islam (57) ABSTRACT

An adapter plate assembly for stocking a variety of different modular boxes includes a first adapter plate that has a plurality of protrusions to engage structural features of a first modular box. The first adapter plate has a plurality of holes each extending to accommodate structural features of a second modular box. A pair of first blocks is each of the first blocks is pivotally coupled to the first adapter plate to abut an outer wall of the second modular box. A second adapter plate has a plurality of openings to accommodate structural features of the second modular box. A pair of second blocks is each removably coupled to the second adapter plate to abut an outer wall of the second modular box.

13 Claims, 8 Drawing Sheets

ADAPTER PLATE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to adapter devices and more particularly pertains to a new adapter device for stacking a variety of different modular boxes.

(2) Description of Related Art Including Information Disclosed Under 37 CFR 1.97 and 1.98

The prior art relates to adapter devices including a modular stacking plate that includes a plurality of slidable engagements for accommodating stackable storage modules. The prior art discloses a storage device that includes a plate and a plurality of bins that are coupled to the plate. The prior art discloses a suitcase that has structure features for engaging an additional suitcase being stacked thereon. The prior art discloses an adapter that is insertable into a telecommunications module. The prior art discloses an adapter plate that has a plurality of openings and protrusions for engaging structural features of a modular box being stacked thereon.

BRIEF SUMMARY OF THE INVENTION

An embodiment of the disclosure meets the needs presented above by generally comprising a first adapter plate that has a plurality of protrusions to engage structural features of a first modular box. The first adapter plate has a plurality of holes each extending to accommodate structural features of a second modular box. A pair of first blocks is each of the first blocks is pivotally coupled to the first adapter plate to abut an outer wall of the second modular box. A second adapter plate has a plurality of openings to accommodate structural features of the second modular box. A pair of second blocks is each removably coupled to the second adapter plate to abut an outer wall of the second modular box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new adapter device embodying the principles and concepts of an embodiment of the disclosure and generally designated by the reference numeral 10 will be described.

As best illustrated in FIGS. 1 through 8, the adapter plate assembly 10 generally comprises a first adapter plate 12 that has a plurality of protrusions 14 each extending downwardly therefrom. Each of the protrusions 14 is strategically located on the first adapter plate 12 to engage structural features of a first modular box 16 when the first adapter plate 12 is positioned on the first modular box 16. The first modular box 16 may be a tool box, a storage box or any type of box produced by any manufacturer. The first adapter plate 12 has a plurality of holes 18 each extending therethrough and each of the holes 18 is strategically located on the first adapter plate 12. In this way each of the holes 18 can accommodate structural features of a second modular box 20 when the second modular box 20 is positioned on the first adapter plate 12.

The first adapter plate 12 has a top surface 22, a bottom surface 24 and a perimeter edge 26 extending therebetween, and the perimeter edge 26 has a front side 28, a back side 30, a first lateral side 32 and a second lateral side 34. Each of the holes 18 extends through the top surface 22 and the bottom surface 24, and each of the holes 18 is positioned adjacent to a respective one of four corners 36 of the first adapter plate 12. The first adapter plate 12 has a first slot 38 extending front the first lateral side 32 toward the second lateral side 34. Additionally, the first adapter plate 12 has a second slot 40 extending from the second lateral side 34 toward the first lateral side 32. The first adapter plate 12 has a third slot 42 extending from the front side 28 toward the back side 30.

The bottom surface 24 has a channel 44 extending upwardly toward the top surface 22. The channel 44 extends from the front side 28 toward the back side 30, and the channel 44 is aligned with and intersecting the third slot 42. An engagement 46 is movably coupled to the first adapter plate 12 and the engagement 46 is positionable in a deployed position having the engagement 46 extending downwardly from the first adapter plate 12. In this way the engagement 46 can abut an outer wall 48 of the first modular box 16 thereby inhibiting the first adapter plate 12 from sliding off of the first modular box 16.

The engagement 46 has a first end 50, a second end 52 and a lower surface 54, and the engagement 46 is elongated between the first end 50 and the second end 52. The lower surface 54 has a ridge 56 extending downwardly therefrom and the ridge 56 is aligned with the first end 50. The ridge 56 is coextensive with the first end 50 and the engagement 46 is movably positioned in the channel 44 having the ridge 56 extending downwardly from the first adapter plate 12. The second end 52 is pivotally coupled to the first adapter plate 12. The engagement 46 is biased to angle downwardly in the channel 44 such that the ridge 56 extends beyond the bottom surface 24 of the first adapter plate 12. As is most clearly shown in FIG. 3, a biasing member 58 may be positioned beneath the engagement 46 for biasing the engagement 46 to angle downwardly.

A pair of first blocks 60 is each pivotally coupled to the first adapter plate 12. Each of the first blocks 60 is positionable in a deployed position having each of the first blocks 60 extending upwardly from the first adapter plate 12. In this way each of the first blocks 60 abuts an outer wall 62 of the second modular box 20 thereby inhibiting the second modular box 20 from sliding off of the first adapter plate 12. Each of the first blocks 60 is positionable in a stored position having each of the first blocks 60 being recessed in the first adapter plate 12. Each of the first blocks 60 has a first lateral edge 64 and a second lateral edge 66, and each of the first lateral edge 64 and the second lateral edge 66 of each of the first blocks 60 pivotally engages a respective first bounding edge 69 and a second bounding edge 71 of a respective one of the first slot 38 and the second slot 40. Each of the first blocks 60 lies on a plane that is oriented perpendicular to the top surface 22 when the first blocks 60 are in the deployed position.

A second adapter plate 72 is provided that has a plurality of openings 74 each extending through the second adapter plate 72. Each of the openings 74 is strategically located on the second adapter plate 72 to accommodate structural features of the second modular box 20 when the second adapter plate 72 is positioned on the second modular box 20. The second modular box 20 may be a tool box, a storage box or any type of storage box produced by any manufacturer.

The second adapter plate 72 has an upper surface 76, a lower surface 78 and an outer edge 80 extending therebetween, and the outer edge 80 has a front side 82, a back side 84, a first lateral side 86 and a second lateral side 88. Each of the openings 74 extends through the upper surface 76 and the lower surface 78, each of the openings 74 has a bounding edge 90 and the bounding edge 90 of each of the openings 74 has a first side 92 and a second side 94. The second adapter has a plurality of lips 96 that is each coupled to the bounding edge 90 of a respective one of the openings 74. In this way each of the plurality of lips 96 can support structural features of the second modular box 20. Moreover, each of the lips 96 is aligned with an intersection between the first side 92 and the second side 94 and each of the lips 96 is aligned with the lower surface 78. The back side 84 of the outer edge 80 is chamfered between the upper surface 76 and the lower surface 54.

The first lateral side 32 of the outer edge 80 has a primary slot 98 extending toward the second lateral side 34 of the outer edge 80. The second lateral side 34 of the outer edge 80 has a secondary slot 100 extending toward the first lateral side 32 of the outer edge 80. A pair of second blocks 102 is each removably coupled to the second adapter plate 72. Each of the second blocks 102 is positionable in a deployed position having each of the second blocks 102 extending downwardly from the second adapter plate 72. In this way each of the second blocks 102 abuts an outer wall 104 of the second modular box 20 thereby inhibiting the second modular box 20 from sliding from beneath the second adapter plate 72. Moreover, each of the second blocks 102 is positionable in a stored position has each of the second blocks 102 being recessed in the second adapter plate 72.

Each of the second blocks 102 has a first lateral edge 106 and a second lateral edge 108. Each of the first lateral edge 64 and the second lateral edge 66 of each of the second blocks 102 pivotally engages a respective one of a first bounding edge 107 and a second bounding edge 108 of a respective one of the primary slot 98 and the secondary slot 100. Each of the second blocks 102 lies on a plane that is oriented perpendicular to the lower surface 54 of the second adapter plate 72 when the second blocks 102 are positioned in the deployed position. The second adapter plate 72 has a plurality of slots 110 each extending through the upper surface 76 and the lower surface 78 and the slots 110 are distributed along the back side 84 for receiving cargo straps or the like.

Figure 1:
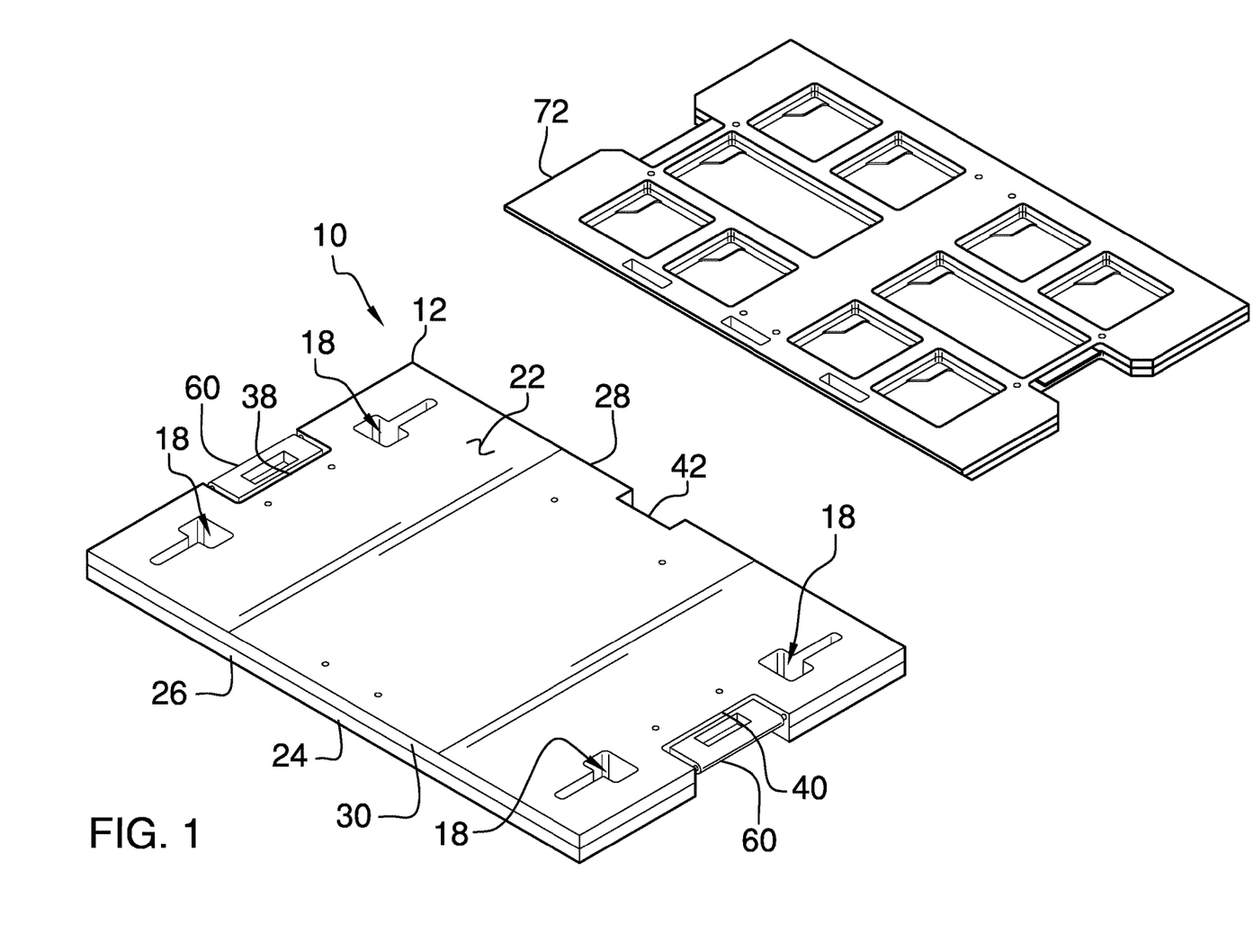
FIG. 1 is a perspective view of an adapter plate assembly according to an embodiment of the disclosure.
Figure 2:
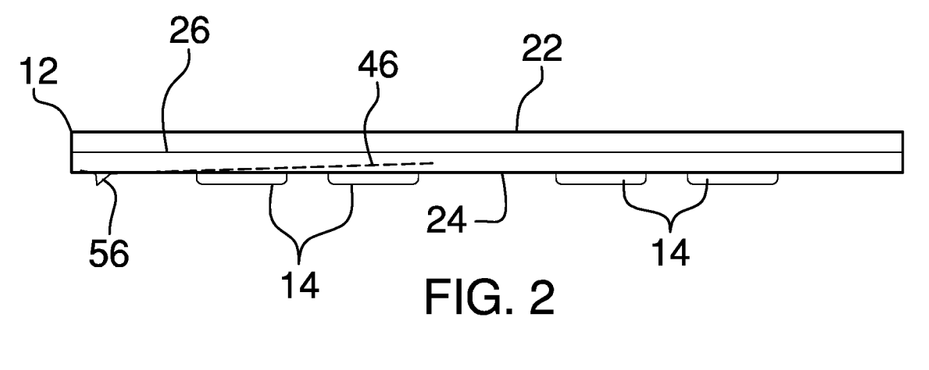
FIG. 2 is a left side view of a first adapter plate of an embodiment of the disclosure.
Figure 3:
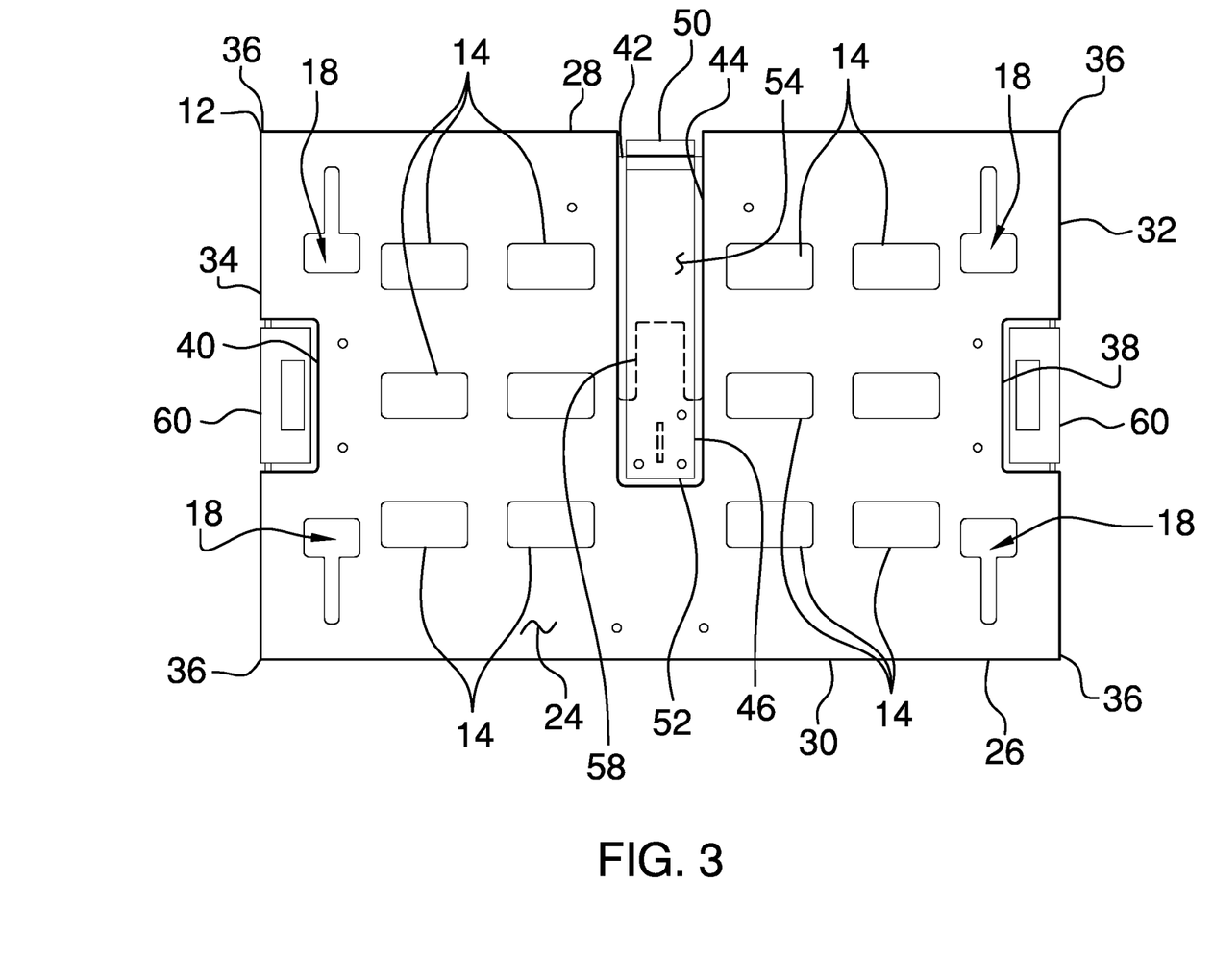
FIG. 3 is a bottom phantom view of a first adapter plate of an embodiment of the disclosure.
Figure 4:
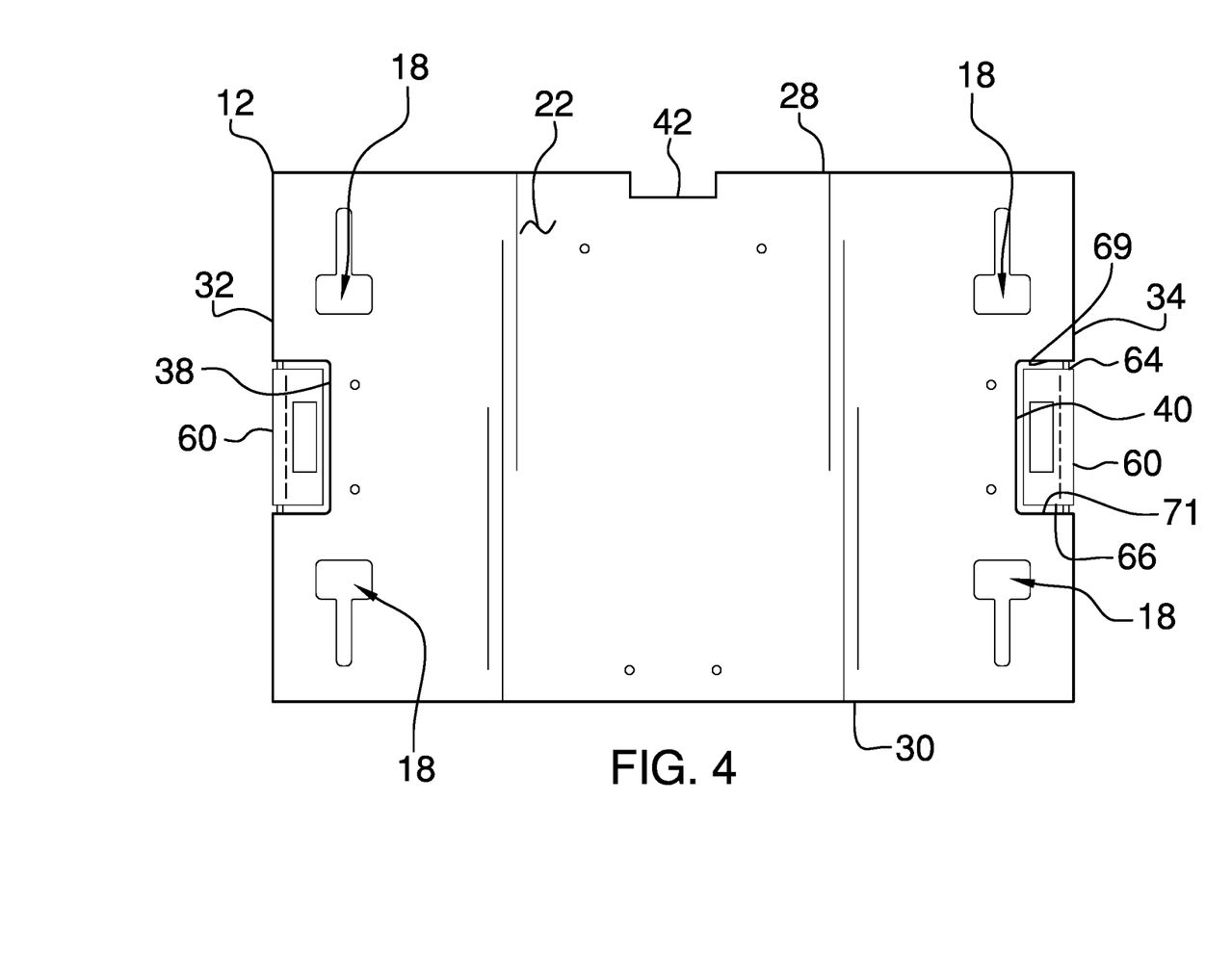
FIG. 4 is a top view of a first adapter plate of an embodiment of the disclosure.
Figure 5:
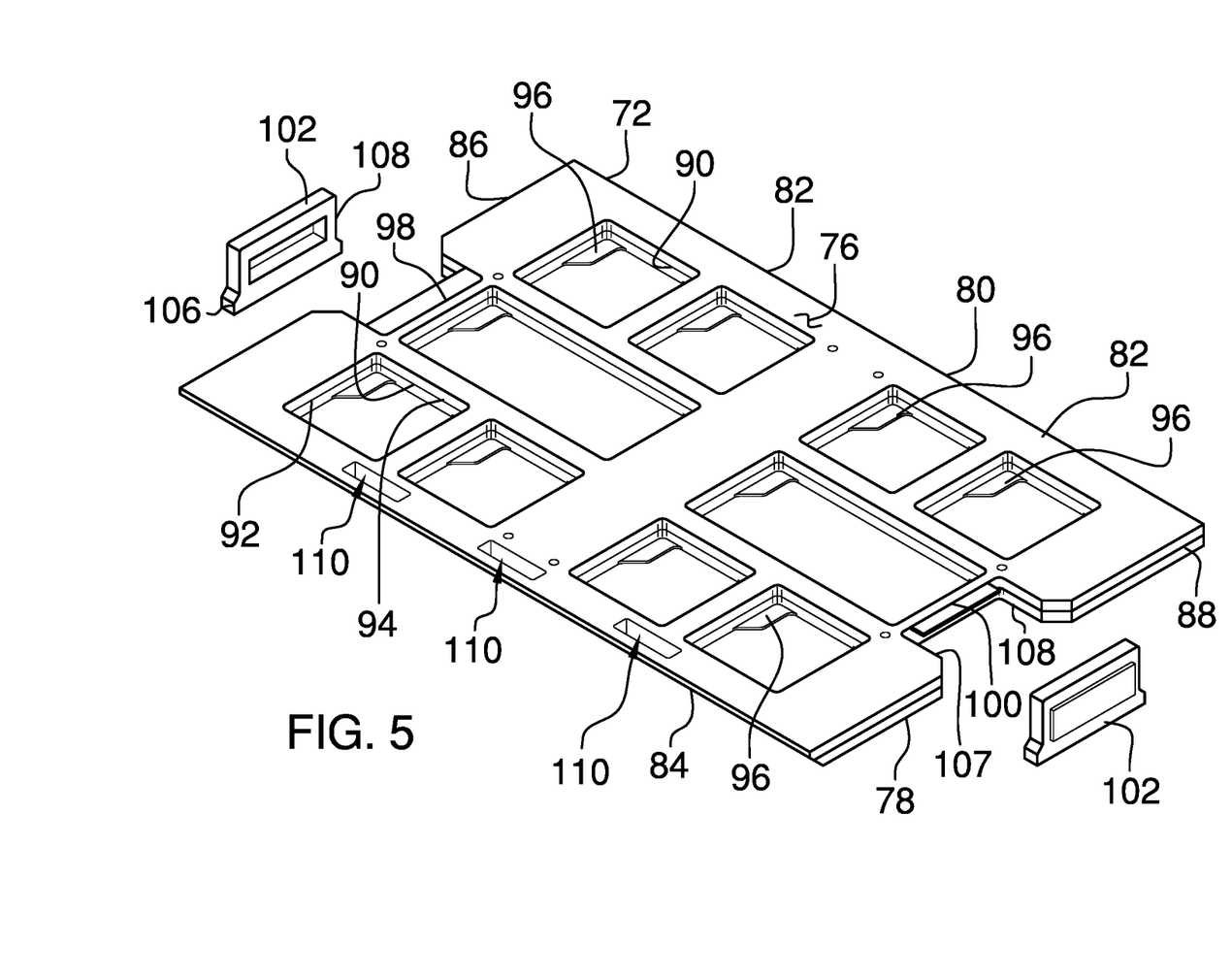
FIG. 5 is a top perspective view a second adapter plate of an embodiment of the disclosure.
Figure 6:
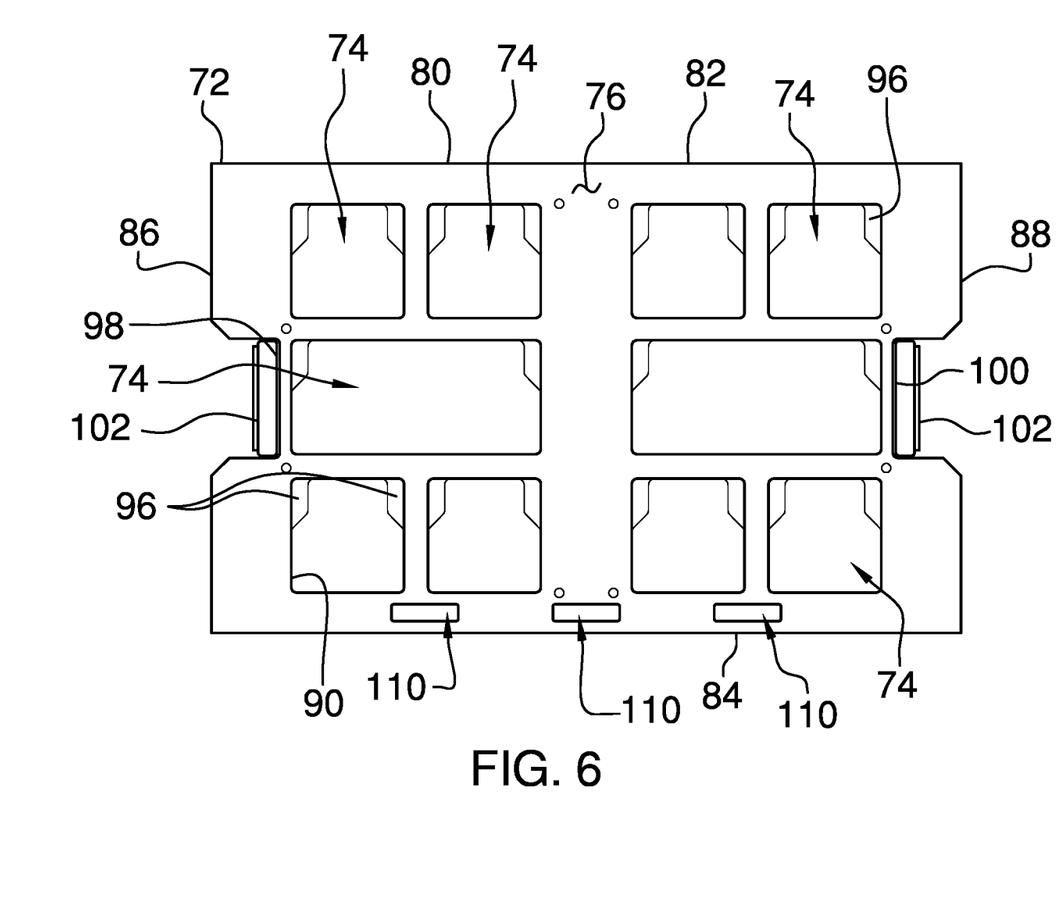
FIG. 6 is a top view of second adapter plate of an embodiment of the disclosure.
Figure 7:
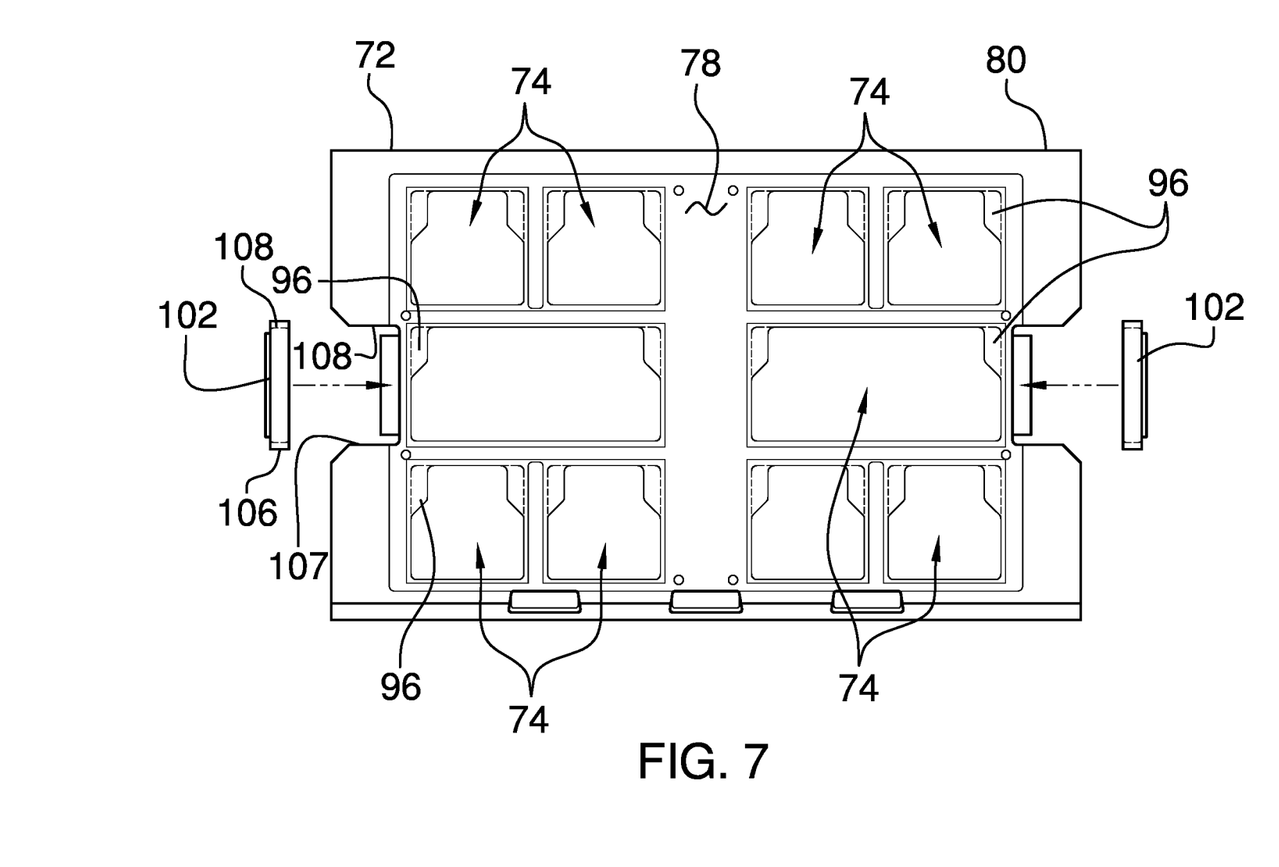
FIG. 7 is an exploded top view of a second adapter plate of an embodiment of the disclosure.
Figure 8:
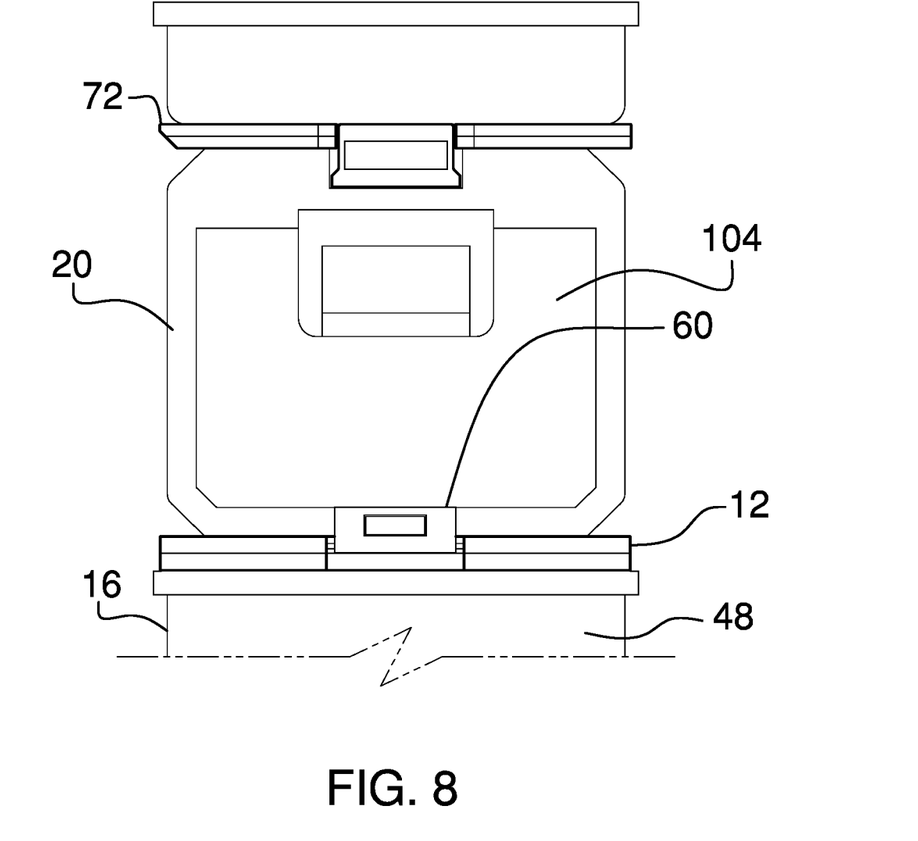
FIG. 8 is a perspective in-use view of an embodiment of the disclosure.

In use, the first adapter plate 12 is positioned on the first modular box 16 and the second modular box 20 is stacked on the first adapter plate 12. Each of the first blocks 60 is moved into the deployed position to inhibit the second modular box 20 from sliding laterally off of the first adapter plate 12. In this way the first adapter plate 12 facilitates the second modular box 20 to be securely stacked on the first modular box 16 whereas otherwise the structural features of the first modular box 16 and the second modular may inhibit secure stacking. The second adapter plate 72 is stacked on the second modular box 20 and each of the second blocks 102 is urged into the deployed position. In this way the second adapter plate 72 is retained on the second modular box 20. Additionally, a third modular box can be stacked on the second adapter plate 72. In this way a plurality of modular boxes, each having a unique structural design, can be securely stacked upon each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adapter plate assembly for stacking a variety of modular boxes of various manufacturers on top of each other in a fixed manner, said assembly comprising:
   a first adapter plate having a plurality of protrusions each extending downwardly therefrom, each of said protrusions being strategically located on said first adapter plate wherein each of said protrusions is configured to engage structural features of a first modular box when said first adapter plate is positioned on the first modular box, said first adapter plate having a plurality of holes each extending therethrough, each of said holes being strategically located on said first adapter plate wherein each of said holes is configured to accommodate structural features of a second modular box when the second modular box is positioned on the first adapter plate;
   an engagement being movably coupled to said first adapter plate, said engagement being positionable in a deployed position having said engagement extending downwardly from said first adapter plate wherein said engagement is configured to abut an outer wall of the first modular box thereby inhibiting said first adapter plate from sliding off of the first modular box;
   a pair of first blocks, each of said first blocks being pivotally coupled to said first adapter plate, each of said first blocks being positionable in a deployed position having each of said first blocks extending upwardly from said first adapter plate wherein each of said first blocks is configured to abut an outer wall of the second modular box thereby inhibiting the second modular box from sliding off of said first adapter plate, each of said first blocks being positionable in a stored position having each of said first blocks being recessed in said first adapter plate;
   a second adapter plate having a plurality of openings each extending through said second adapter plate, each of said openings being strategically located on said second adapter plate wherein each of said openings is configured to accommodate structural features of the second modular box when said second adapter plate is positioned on the second modular box; and
   a pair of second blocks, each of said second blocks being removably coupled to said second adapter plate, each of said second blocks being positionable in a deployed position having each of said second blocks extending downwardly from said second adapter plate wherein each of said second blocks is configured to abut an outer wall of the second modular box thereby inhibiting said the second modular box from sliding from beneath said second adapter plate, each of said second blocks being positionable in a stored position having each of said second blocks being recessed in said second adapter plate.

2. The assembly according to claim 1, wherein said first adapter plate has a top surface, a bottom surface and a perimeter edge extending therebetween, said perimeter edge having a front side, a back side, a first lateral side and a second lateral side, each of said holes extending through said top surface and said bottom surface, each of said holes being positioned adjacent to a respective one of four corners of said first adapter plate.

3. The assembly according to claim 2, wherein said first adapter plate has a first slot extending front said first lateral side toward said second lateral side.

4. The assembly according to claim 3, wherein said first adapter plate has a second slot extending from said second lateral side toward said first lateral side.

5. The assembly according to claim 4, wherein said first adapter plate has a third slot extending from said front side toward said back side.

6. The assembly according to claim 2, wherein:
   said first adapter plate has a first slot therein;
   said first adapter plate has a second slot therein;
   said first adapter plate has a third slot therein;
   said bottom surface has a channel extending upwardly toward said top surface, said channel extending from said front side toward said back side, said channel being aligned with and intersecting said third slot; and
   said engagement has a first end, a second end and a lower surface, said engagement being elongated between said first end and said second end, said lower surface having a ridge extending downwardly therefrom, said ridge being aligned with said first end, said ridge being coextensive with said first end, said engagement being movably positioned in said channel having said ridge extending downwardly from said first adapter plate, said second end being pivotally coupled to said first adapter plate, said engagement being biased to angle downwardly in said channel such that said ridge extends beyond said bottom surface of said first adapter plate.

7. The assembly according to claim 4, wherein each of said first blocks has a first lateral edge and a second lateral edge, each of said first lateral edge and said second lateral edge of each of said first blocks pivotally engaging a respective first bounding edge and a second bounding edge of a respective one of said first slot and said second slot, each of said first blocks lying on a plane being oriented perpendicular to said top surface when said first blocks are in said deployed position.

8. The assembly according to claim 1, Wherein said second adapter plate has an upper surface, a lower surface and an outer edge extending therebetween, said outer edge having a front side, a back side, a first lateral side and a second lateral side, each of said openings extending through said upper surface and said lower surface, each of said openings having a bounding edge, said bounding edge of each of said openings having a first side and a second side.

9. The assembly according to claim 7, wherein said second adapter has a plurality of lips each being coupled to said bounding edge of a respective one of said openings wherein each of said plurality of lips is configured to support structural features of the second modular box, each of said lips being aligned with an intersection between said first side and said second side.

10. The assembly according to claim 8, wherein said first lateral side of said outer edge has a primary slot extending toward said second lateral side of said outer edge.

11. The assembly according to claim 10, wherein said second lateral side of said outer edge has a secondary slot extending toward said first lateral side of said outer edge.

12. The assembly according to claim 11, wherein each of said second blocks has a first lateral edge and a second lateral edge, each of said first lateral edge and said second lateral edge of each of said second blocks pivotally engaging a respective one of a first bounding edge and a second bounding edge of a respective one of said primary slot and said secondary slot, each of said second blocks lying on a plane being oriented perpendicular to said lower surface of said second adapter plate when said second blocks are positioned in said deployed position.

13. An adapter plate assembly for stacking a variety of modular boxes of various manufacturers on top of each other in a fixed manner, said assembly comprising:
- a first adapter plate having a plurality of protrusions each extending downwardly therefrom, each of said protrusions being strategically located on said first adapter plate wherein each of said protrusions is configured to engage structural features of a first modular box when said first adapter plate is positioned on the first modular box, said first adapter plate having a plurality of holes each extending therethrough, each of said holes being strategically located on said first adapter plate wherein each of said holes is configured to accommodate structural features of a second modular box when the second modular box is positioned on the first adapter plate, said first adapter plate having a top surface, a bottom surface and a perimeter edge extending therebetween, said perimeter edge having a front side, a back side, a first lateral side and a second lateral side, each of said holes extending through said top surface and said bottom surface, each of said holes being positioned adjacent to a respective one of four corners of said first adapter plate, said first adapter plate having a first slot extending front said first lateral side toward said second lateral side, said first adapter plate having a second slot extending from said second lateral side toward said first lateral side, said first adapter plate having a third slot extending from said front side toward said back side, said bottom surface having a channel extending upwardly toward said top surface, said channel extending from said front side toward said back side, said channel being aligned with and intersecting said third slot;
- an engagement being movably coupled to said first adapter plate, said engagement being positionable in a deployed position having said engagement extending downwardly from said first adapter plate wherein said engagement is configured to abut an outer wall of the first modular box thereby inhibiting said first adapter plate from sliding off of the first modular box, said engagement having a first end, a second end and a lower surface, said engagement being elongated between said first end and said second end, said lower surface having a ridge extending downwardly therefrom, said ridge being aligned with said first end, said ridge being coextensive with said first end, said engagement being movably positioned in said channel having said ridge extending downwardly from said first adapter plate, said second end being pivotally coupled to said first adapter plate, said engagement being biased to angle downwardly in said channel such that said ridge extends beyond said bottom surface of said first adapter plate;
- a pair of first blocks, each of said first blocks being pivotally coupled to said first adapter plate, each of said first blocks being positionable in a deployed position having each of said first blocks extending upwardly from said first adapter plate wherein each of said first blocks is configured to abut an outer wall of the second modular box thereby inhibiting the second modular box from sliding off of said first adapter plate, each of said first blocks being positionable in a stored position having each of said first blocks being recessed in said first adapter plate, each of said first blocks having a first lateral edge and a second lateral edge, each of said first lateral edge and said second lateral edge of each of said first blocks pivotally engaging a respective first bounding edge and a second bounding edge of a respective one of said first slot and said second slot, each of said first blocks lying on a plane being oriented perpendicular to said top surface when said first blocks are in said deployed position;
- a second adapter plate having a plurality of openings each extending through said second adapter plate, each of said openings being strategically located on said second adapter plate wherein each of said openings is configured to accommodate structural features of the second modular box when said second adapter plate is positioned on the second modular box, said second adapter plate having an upper surface, a lower surface and an outer edge extending therebetween, said outer edge having a front side, a back side, a first lateral side and a second lateral side, each of said openings extending through said upper surface and said lower surface, each of said openings having a bounding edge, said bounding edge of each of said openings having a first side and a second side, said second adapter having a plurality of lips each being coupled to said bounding edge of a respective one of said openings wherein each of said plurality of lips is configured to support structural features of the second modular box, each of said lips being aligned with an intersection between said first side and said second side, said back side of said outer edge being chamfered between said upper surface and said lower surface, said first lateral side of said outer edge having a primary slot extending toward said second lateral side of said outer edge, said second lateral side of said outer edge having a secondary slot extending toward said first lateral side of said outer edge; and
- a pair of second blocks, each of said second blocks being removably coupled to said second adapter plate, each of said second blocks being positionable in a deployed position having each of said second blocks extending downwardly from said second adapter plate wherein each of said second blocks is configured to abut an outer wall of the second modular box thereby inhibiting said the second modular box from sliding from beneath said second adapter plate, each of said second blocks being positionable in a stored position having each of said second blocks being recessed in said second adapter plate, each of said second blocks having a first lateral edge and a second lateral edge, each of said first lateral edge and said second lateral edge of each of said second blocks pivotally engaging a respective one of a first bounding edge and a second bounding edge of a respective one of said primary slot and said secondary slot, each of said second blocks lying on a plane being oriented perpendicular to said lower surface of said second adapter plate when said second blocks are positioned in said deployed position.

\* \* \* \* \*